United States Patent [19]
Modic et al.

[11] Patent Number: 5,891,410
[45] Date of Patent: *Apr. 6, 1999

[54] PROCESS FOR THE PURIFICATION OF AN OXIDATION OFF GAS

[75] Inventors: Rudolf Modic, Steyerberg; Hermann-Josef Korte, Haltern; Anton Schoengen, Witten; Johann-Heinrich Schroeder, Dortmund; Jörg Porschen, Niederzier-Ellen, all of Germany

[73] Assignee: Huls Aktiengesellschaft, Troisdorf, Germany

[ * ] Notice: This patent issued on a continued prosecution application filed under 37 CFR 1.53(d), and is subject to the twenty year patent term provisions of 35 U.S.C. 154(a)(2). The term of this patent shall not extend beyond the expiration date of Pat. No. 5,614,159.

[21] Appl. No.: 27,160
[22] PCT Filed: Aug. 20, 1991
[86] PCT No.: PCT/EP91/01577
  § 371 Date: Feb. 24, 1993
  § 102(e) Date: Feb. 24, 1993
[87] PCT Pub. No.: WO92/03213
  PCT Pub. Date: Mar. 5, 1992

[30] Foreign Application Priority Data

Aug. 24, 1990 [DE] Germany .......................... 40 26 733.4

[51] Int. Cl.⁶ .................................................. B01D 53/44
[52] U.S. Cl. ..................................... 423/245.1; 423/245.3; 95/237; 588/205
[58] Field of Search ................................ 423/210, 245.1, 423/245.3, 246; 562/414, 416; 95/237; 588/205

[56] References Cited

U.S. PATENT DOCUMENTS

| 4,102,983 | 7/1978 | Yamase et al. ........................ 423/245 |
| 4,172,209 | 10/1979 | Vora ........................................ 562/414 |
| 4,211,881 | 7/1980 | Horsfield et al. ...................... 562/416 |
| 5,142,097 | 8/1992 | Michel et al. ........................... 560/78 |
| 5,614,159 | 3/1997 | Modic et al. ........................ 423/245.3 |

FOREIGN PATENT DOCUMENTS

| 0135341 | 3/1985 | European Pat. Off. ............... 562/414 |
| 0 190 649 | 8/1986 | European Pat. Off. . |
| 0 222 158 | 5/1987 | European Pat. Off. . |
| 2640887 | 6/1990 | France ................................ 423/245.3 |
| 27 59 208 | 7/1979 | Germany . |
| 2097476 | 11/1982 | United Kingdom . |

OTHER PUBLICATIONS

"Unit Processes and Principles of Chemical Engineering" by John C Olsen 1932, D Van Nostrand Co., New York pp. 1–3.

*Primary Examiner*—Gary P. Straub
*Assistant Examiner*—Timothy C Vanoy
*Attorney, Agent, or Firm*—Millen, White, Zelano, & Branigan, P.C.

[57] ABSTRACT

A process is disclosed for the purification of an off-gas which originates from the oxidation of xylene with air in the Witten process for the preparation of dimethyl terephthalate by subjecting the off-gas to a partial condensation step to remove constituents such as dimethyl terephthalate and xylene; then contacting the off-gas with a solvent such as para-toluic acid or a mixture of para-toluic acid and methyl benzoate so as to remove contaminants such as para-xylene out of the off-gas; then contacting the off-gas with a solvent such as methyl benzoate to remove contaminants such as methyl para-toluate out of the off-gas; then contacting the off-gas with water so as to remove contaminants such as methanol out of the off-gas, and then combusting the off-gas.

15 Claims, 3 Drawing Sheets

PROCESS FOR THE PURIFICATION OF AN OXIDATION OFF GAS

This application is a national stage filing under 35 U.S.C. 371 of PCT/EP91/01577 filed 20 Aug. 1991.

BACKGROUND OF THE INVENTION

TECHNICAL FIELD

The invention relates to a process for the purification of an off gas (exhaust gas) which originates from a reaction process operated under a pressure of 5 to 50 bar and which is contaminated with aliphatic and/or aromatic substances, by scrubbing off the off gas. The off gas to be purified originates from an oxidation of xylene with an oxygen-containing gas, for example from the oxidation of para-xylene (p-X) with air by the so-called Witten DMT process for the preparation of dimethyl terephthalate (DMT).

In the Witten DMT process, a mixture of p-X and methyl para-toluate (p-TE) in the liquid phase is oxidized in the absence of solvents foreign to the process and of halogen compounds at a pressure of about 4 to 8 bar and a temperature of about 140° to 180° C. with air (atmospheric oxygen) in the presence of dissolved heavy metal oxidation catalysts, for example in the presence of a mixture of cobalt and manganese compounds (cf. German Patent 20 10 137).

In this process carried out industrially on a large scale, the oxidation with air produces an off gas which, depending on the oxidation pressure and on the temperature and the physical properties, is typically saturated with the following fractions:

a) 0.4 to 0.6% by weight of a relatively high-boiling fraction of DMT, monomethyl terephthalate (MMT), terephthalaldehydic acid methyl ester (TAE), para-toluic acid (p-TA) and terephthalic acid (TPA). Some of these products form during the cooling off sublimates having a high melting point, unless they are dissolved in the other components;

b) 14 to 22% by weight of a water-insoluble fraction having a medium boiling point and consisting of products such as p-TE, methyl benzoate (BME) and p-X;

c) 7 to 10% by weight of a fraction having a medium boiling point and consisting of water-soluble products such as acetic acid, formic acid, water of reaction and methanol;

d) 0.2 to 0.3% by weight of low boilers, such as methyl acetate, methyl formate, acetaldehyde, formaldehyde, dimethyl ether and the like.

The carrier off gas for the above substances consists of:

e) the nitrogen of the air;

f) a residual oxygen content of 0.5 to 3% by weight (of 6 to 8% by weight when the explosion limits are reached);

g) the byproducts of the reaction: 1 to 3% by weight of $CO_2$ and 0.3 to 2.0% by weight of CO.

From the economic point of view, the above-mentioned substances are divided into so-called useful products and waste substances. The useful products are recycled to the total process.

The waste substances must be disposed off in a manner which is as environment-friendly as possible. These waste substances include CO, the low boilers acetaldehyde, formaldehyde and dimethyl ether, and acetic acid and formic acid.

In the case of the useful products, a distinction can be made between water-soluble ones, such as methanol, and water-insoluble ones, such as p-X, DMT, p-TE, etc.

Regarding the "Witten DMT process" (Katzschmann process), reference may be made to German Patent 1,041,945, German Patent 1,299,627, DE-A-20 14 012, DE-C3-22 44 662, DE-C3-24 27 875, DE-C2-29 16 197, DE-C2-30 11 858, DE-C2-30 37 045, DE-C2-30 44 617, EP-B1-0 053 241, DE-C1-31 51 383, EP-B1-0 156 133, EP-B1-0 157 122, DE-C1-34 40 650 and WO 90/09367 and Hydrocarbon Processing, November 1983, page 91. Where reference is made in the present description to the total process, these publications are referred to.

The off gas from the oxidation by the Witten DMT process is usually cooled in several stages, the relatively high-boiling and medium-boiling components substantially condensing stepwise. After scrubbing with cold water, the off gas stream is substantially freed from residual organic substituents in an activated carbon adsorption (Ullmann, 4th Edition 1982, Volume 22, page 529 et seq.; DE-C1-34 40 650 and DE-A1-24 61 092).

A similar waste gas purification with cooling and subsequent scrubbing with water is known for the oxidation waste gases in the so-called AMOCO process (Ullmann, 4th Edition 1982, Volume 22, page 519 et seq.).

This waste gas purification has the disadvantage that the adsorption stage (activated carbon plant) can only be operated discontinuously, that the working up of the activated carbon desorbate is expensive and that the energies contained in the waste gas can be utilized only to a limited extent. Finally, it is not possible to remove the CO present in the waste gas by means of adsorption using activated carbon.

GB-A-2 097 476 (=DE-A1-32 15 437) discloses a process for utilizing the mechanical energy of a residue gas, in which the residue gas is used for cooling a gas turbine with subsequent mixing the residue gas with the combustion air. Combustion of the residue gas is neither intended nor possible in this process.

SUMMARY OF THE INVENTION

The object of the present invention is therefore to remove as substantially as possible, in continuously operated stages, the organic products present in the off gas. A further object of the invention is to utilize as substantially as possible the energy contained in the off gas (pressure, temperature, oxidizable products). Finally, it is a further object of the invention to minimize the CO content of the off gas.

The invention achieves this object by virtue of the fact that the off gas is subjected to purification by absorption under pressure, the absorbent consisting predominantly of an ester or of an ester mixture. The ester or the ester mixture has a higher boiling point than the organic substances to be washed out.

In the preferred application of the process according to the invention for the purification of the oxidation off gas from an oxidation of p-X with air, the absorption can preferably be preceded by a (partial) condensation, in particular at a temperature of 35° to 60° C., preferably at about 40° C. By separating off the condensate, the major part of the medium- and high-boiling organic constituents of the off gas (p-TE, DMT, BME) and of the p-xylene and of methanol can be removed from the off gas. The (partial) condensation can also be carried out in a condensation scrubbing stage.

The remaining off gas stream contains predominantly p-X and methanol as useful products. These substances are preferably removed in an absorption, the absorption preferably being carried out in several stages. In the first absorption stage, the absorbent (solvent) consists predominantly of p-TE. The p-X of the off gas is dissolved in the p-TE, with the exception of traces, and is washed out with the p-TE. In a preferred embodiment of the invention, the off gas freed from the p-X and enriched with the solvent (p-TE) of the first absorption stage is washed, in a second absorption stage, with a further, preferably lower-boiling solvent, which consists in particular predominantly of BME and/or methanol, by a countercurrent method. The off gas, which preferably cools to 20° to 30° C., is freed in this second absorption stage in particular from the solvent of the first stage (p-TE) and then contains virtually exclusively methanol as the useful product.

The methanol still contained in the off gas is preferably absorbed by further scrubbing with water, the temperature being about 10° to 20° C., preferably about 15° C., for reasons relating to energy. After this third absorption stage, the off gas contains only traces of useful products.

For the process according to the invention, it is particularly advantageous to choose, as the absorbent for methanol, a process waste water which is enriched with distillable waste substances (for example acetic acid, formic acid, formaldehyde, etc.) but is free of useful substances. The vaporous fraction of the waste water, which fraction is taken over in the off gas stream, can then be disposed off very advantageously by subsequent combustion. Even if methanol absorption is unnecessary, it is very advantageous if the off gas which has been freed beforehand by the stated condensation of useful products and at the same time completely or partly dried is saturated, by means of waste water vapor produced by waste heat, with the distillable waste substances present therein.

The combustible constituents still present, in particular CO and some organic products originating from the scrubbing water, such as acetic acid, formic acid and the constituents of the off gas which have not been removed by absorption, can be used, in a particularly preferred embodiment of the invention, for heating the off gas by combustion, in particular under pressure, the mechanical or thermal energy being used in an expansion turbine. Preferably, oxygen (air) and a fuel are additionally fed to the off gas prior to combustion, in order to achieve energetically useful utilization with relatively high efficiency. However, it is also possible to burn the oxidizable constituents catalytically.

In a preferred embodiment of the invention, after the final absorption stage the off gas is first heated with the oxidation off gas by a countercurrent method and then saturated with a process waste water which is contaminated with organic waste substances. The waste water can be evaporated with waste heat from the process. In this way, some of the process waste water can be disposed off in a manner which is energetically particularly advantageous.

Using the process according to the invention, it is possible, in a surprisingly simple manner, to achieve complete purification of the off gas from oxidation processes operated with oxygen-containing gas, and the energy present in the off gas (thermal, material and mechanical) can be substantially recovered.

BRIEF DESCRIPTION OF DRAWINGS

The invention is described in detail below with reference to an embodiment and to the drawing. As diagrams of the plant.

Figure 1:
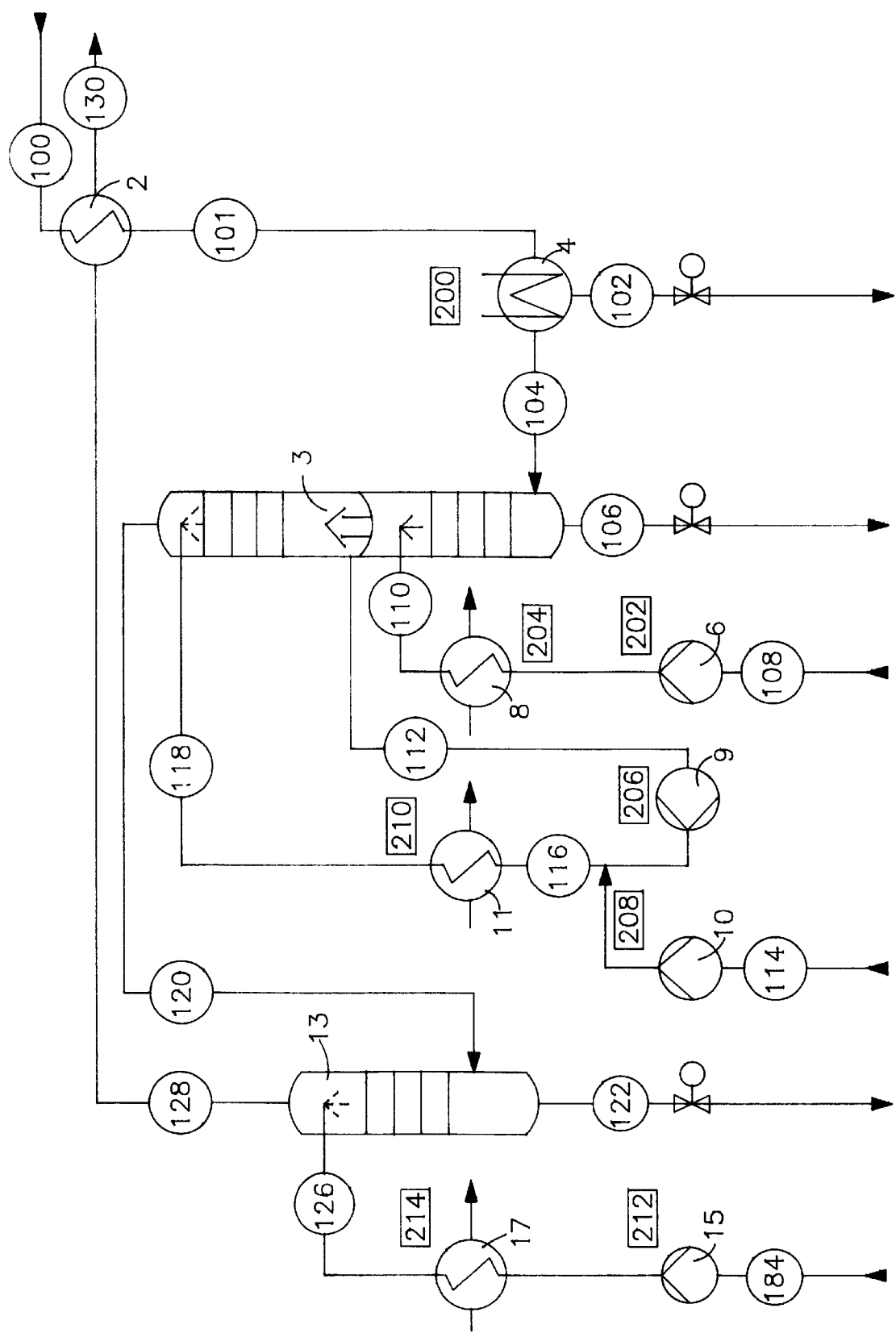
FIG. 1 shows an off gas purification plant according to the invention
Figure 2:
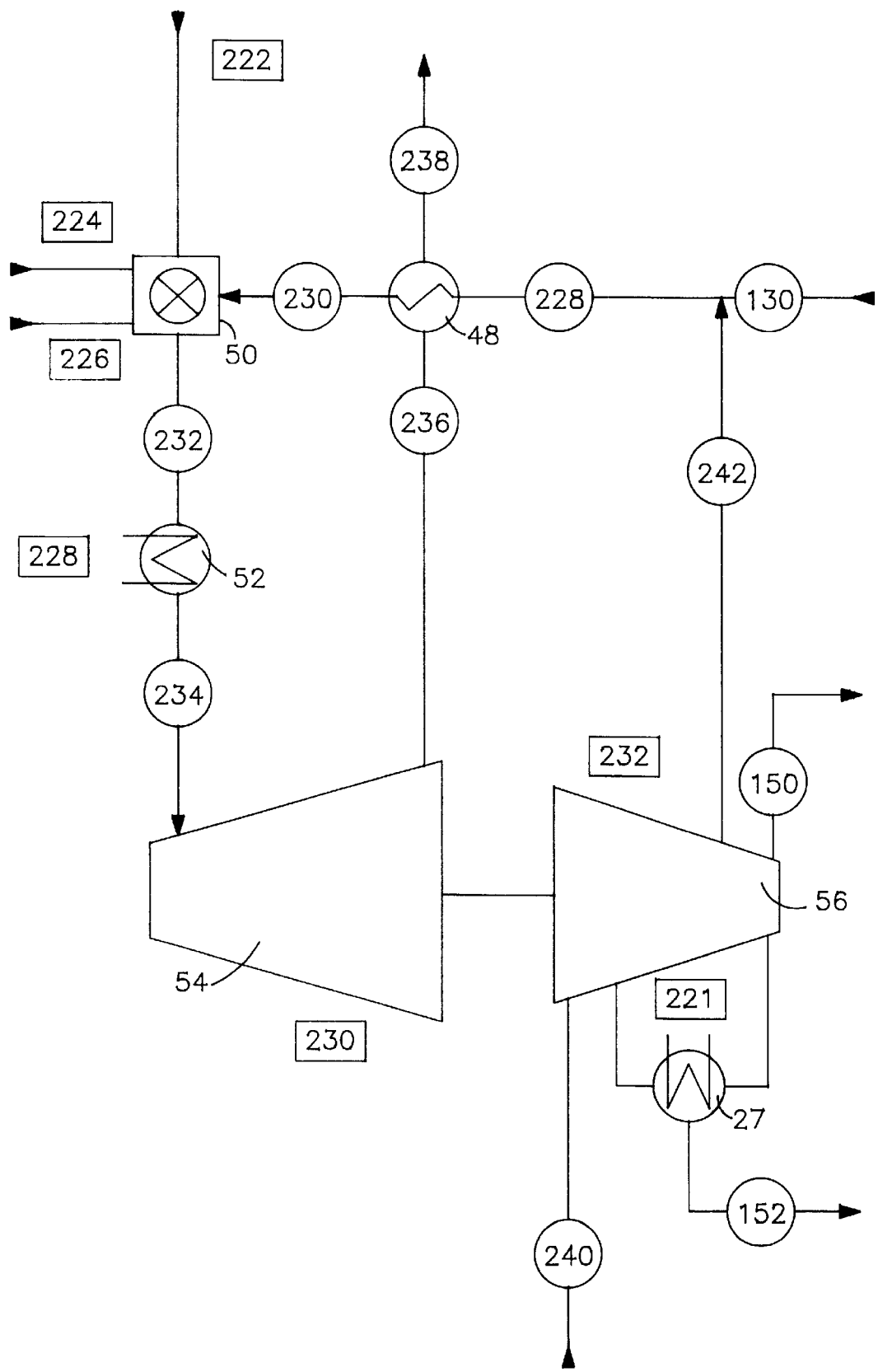
FIG. 2 shows a downstream energy recovery plant

The mass streams 100 to 242 (circled) shown in FIG. 1 and 2 are specified in Table 1. In Table 2, the energy streams 200 to 232 (designated with a rectangular border in the Figure) are balanced.

BEST MODE FOR CARRYING OUT THE INVENTION

EXAMPLE 1

In a plant for the production of terephthalic acid (TPA) from DMT as an intermediate product, corresponding to DE-C2-3 044 617, having a capacity of 250,000 tonnes per year, about 93,000 kg/h of off gases are obtained from the oxidation and are purified in an off gas treatment stage according to FIG. 1 and 2.

In addition to the oxidation off gas, the following mass streams are taken from the total process:

Mass stream 108, a fraction, containing predominantly p-TE, from the distillation of the crude ester;

Mass stream 114, a fraction, containing predominantly BME, from the so-called working up of the B-ester;

Mass stream 184, a process water contaminated with organic waste products;

Energy stream 222, about 600 kg/h of dimethyl ether (DME), which is obtained by distillation from the methanol-containing top product of the hydrolysis;

Energy stream 224, about 858 kg/h of combustible liquid residues from working up of the residue;

Energy stream 226, about 760 kg/h of natural gas.

The off gas stream 100 from the p-X oxidation, at a temperature of 158° C. and a pressure of 7 bar and saturated with the substances according to Table 1, is cooled via the heat exchanger 2 to a temperature of 120° C. at about the same pressure with the off gas stream 128 to be removed, by a countercurrent method (FIG. 1).

Thereafter, the cooled off gas stream 101 containing the simultaneously predominantly condensed relatively high-boiling components of the contaminating substances is fed to the condenser 4 operated with cooling water, for further cooling and condensation of the residual relatively high-boiling components and some of the medium-boiling components of the useful products and of the water.

The resulting liquid phase 102 is removed from the condenser 4 at a temperature of 40° C. and expanded into a separator (not shown).

The off gas mixture 104 emerging from the condenser 4 is fed, at a temperature of 40° C. and with a load of 1.25% by weight of p-X, 0.16% by weight of methanol and 0.17% by weight of low boilers, to the bottom of the first absorption stage of the two-stage absorption scrubbing column 3 for recovering the p-xylene.

p-TE fraction 108 is taken, at a temperature of 140° C., from the p-TE fraction which is obtained in the total process from the separation of the crude ester by distillation and is recycled to the oxidation (not shown), and said fraction 108 is brought to the pressure of 7 bar by means of the pressure-increasing pump 6, cooled to a temperature of 100° C. by means of the heat exchanger 8 operated with condensate and fed as solvent 110 to the top of the first absorption stage of the two-stage absorption scrubbing column 3 for scrubbing the off gas mixture 104 flowing through, by a countercurrent method.

The off gas mixture which is obtained at the top of the first absorption stage at a temperature of 60° C., having a low xylene content and being enriched with p-TE, flows directly into the bottom of the second stage. In this second stage, the off gas stream is scrubbed for recovery of the p-TE and further cooled.

The BME fraction 114 originates in the total process from the separation of the so-called B-ester fraction by distillation, said fraction mainly consisting of p-TE, BME, TAE and methanol. The B-ester fraction is obtained from the fraction resulting at the top of the crude ester rectification and mainly consisting of p-TE. The BME fraction 114 has a temperature of 104° C. and is brought to the pressure of 7 bar by means of the pressure-increasing pump 10 and is fed into the outer cooling circulation of the second stage of the two-stage absorption scrubbing column 3, which circulation is operated by means of circulating pump 9, and is mixed, at a temperature of 46° C., with the liquid phase 112 obtained at the bottom of the second stage, a temperature of 46.5° C. (mass stream 116) being established. The circulating absorbent predominantly consisting of BME and p-TE is then cooled to a temperature of 25° C. via the heat exchanger 11 operated with cold water and is fed countercurrently, as coolant and solvent 118, to the top of the second stage for scrubbing, for further cooling and condensation of the useful products of the off gas mixture 104 flowing through.

The solvents which have collected at the bottom of the second stage and contain the recovered useful products consisting mainly of p-TE and partly of methanol and BME, flow in a small amount freely into the first absorption stage and are removed at a temperature of 48° C., together with the p-X-containing p-TE fraction 106 of the two-stage absorption column 3, said fraction being obtained at the bottom, and are expanded into the storage tank for the p-TE fraction of the total process which is to be recycled to the oxidation.

The off gas mixture 120 emerging at the top of the two-stage absorption scrubbing column 3 and at a temperature of 26° C. and having a load of 0.12% by weight of methanol and 0.14% by weight of low boilers is fed to the bottom of the absorption column 13 for the recovery of the methanol.

The process waste water 184 having a low methanol content and at a temperature of 40° C. is brought to the pressure of 7 bar by means of the pressure-increasing pump 15, cooled to a temperature of 15° C. by means of the heat exchanger 17 operated with cold water and fed, as solvent 126, to the top of the absorption column 13 for scrubbing countercurrent to the off gas mixture 120 flowing through.

The methanol/water mixture 122 obtained at the bottom at a temperature of 20° C. is expanded into a separator (not shown).

The off gas mixture 128 emerging at the top of the absorption column 13 at a temperature of 15° C., freed from useful products and having a residual load of 0.28% by weight of low boilers is preheated to a temperature of 131° C. (mass stream 130) by heat. released from the off gas stream 100 via the heat exchanger 2 by a countercurrent method and is then heated to a temperature of 340° C. (mass stream 230), together with the air 242 required for post-combustion, via the downstream heat exchanger 48 (FIG. 2) by means of the flue gas stream 236 to be removed and disposed of, by a countercurrent method. The heated off gas 230 is completely burned or incinerated in the combustion chamber 50 with the supply of fuel in the form of vapour and liquid residues obtained under pressure and consisting of dimethyl ether (DME) (energy stream 222) and DMT residue (energy stream 224) from the process and with natural gas (energy stream 226) as additional fuel, at a pressure of 7 bar and a temperature of 1000° C., with utilization of the heat of combustion present in the off gas stream 130.

The flue gas 232 obtained is cooled to a temperature of 650° C. (mass stream 234) via the heat exchanger 52, by heating up a heating medium and/or generating high-pressure steam, which are required in the process, and fed to the hot gas expansion turbine 54.

In the turbine 54, expansion of the flue gas to the pressure of 1.05 bar and at the same time cooling to a temperature of 380° C. take place.

The mechanical energy liberated is fed directly as drive energy to the air compressor 56 which runs on the same shaft, producing the air stream 150 for the oxidation at a pressure of 9 bar and at a temperature of 115° C. and supplying the air 242 for the post-combustion of the simultaneously liberated off gas mixture 130 under a pressure of 7 bar at a temperature of 75° C.

The water 152 obtained in the intermediate cooling during the air compression by the heat exchangers 27 operated with cooling water is removed.

The let-down and cooled flue gas 236 from the hot gas turbine 54 is cooled to a temperature of 165° C. for further utilization of the waste heat via the heat exchanger 48 by a countercurrent method with the gas stream 228 intended for post-combustion and is released into the atmosphere.

As can be seen from mass stream 238 in Table 1, the purified off gas contains virtually no more organic constituents and CO and can be safely emitted.

According to Table 2, a total of 10 kW of electrical energy and 18.81 MW of fuels are required for the off gas purification (energy streams 202, 206, 208, 212, 222–226). On the other hand, 11.1 MW are used for steam generation and 8.672 MW for compression of the oxidizer inlet air (mass streams 204, 228 and 230). A balance for the plant according to FIG. 1 and 2 gives a net energy recovery of 980 kW from the off gas.

A conventional off gas purification with three-stage condensation and adsorption on activated carbon has a net energy requirement of 1.852 MW without the associated working-up stages, and the purification of the off gas is considerably poorer. Thus, the process according to the invention permits an energy saving of about 2.8 MW in addition to better purification.

EXAMPLE 2

Figure 3:
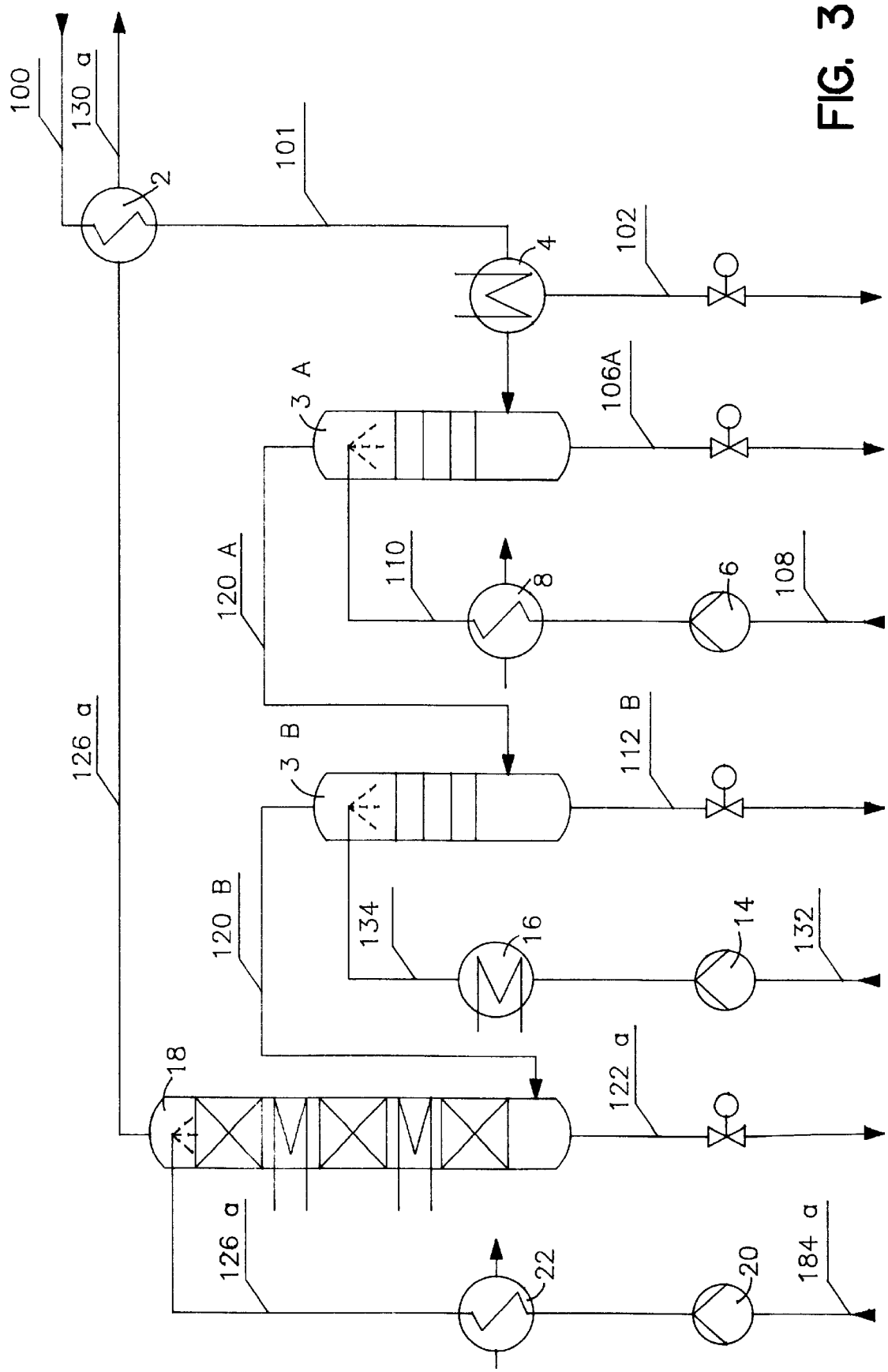
FIG. 3 shows an alternative off gas purification plant similar to FIG. 1.

FIG. 3 shows an alternative off gas purification which substantially corresponds to the plant shown in FIG. 1. After partial condensation of the contaminating substances in the condenser 4, the still dissolved p-X is removed from the off gas, initially in scrubber 3A with a mixture of p-TE and BME. In the second desorption 3B, the BME dissolved in the off gas stream and the p-TE are washed out with methanol 134. Finally, the methanol dissolved in the off gas is washed out in the scrubbing column 18 with water.

TABLE 1.1

| Mass stream Medium | Unit | 100 | 101 | 102 | 104 | 106 | 108 | 110 |
|---|---|---|---|---|---|---|---|---|
| Amount | (kg/h) | 93402 | 93402 | 24083 | 69319 | 6287 | 5000 | 5000 |
| Pressure | [bar] | 7 | 7 | 7 | 7 | 7 | 1,1 | 7 |

TABLE 1.1-continued

| Mass stream Medium | Unit | 100 | 101 | 102 | 104 | 106 | 108 | 110 |
|---|---|---|---|---|---|---|---|---|
| Temperature | [20 C.] | 158 | 120 | 40 | 40 | 48 | 140 | 100 |
| Heat content* | [kW] | 10916 | 8365 | 638 | 569 | 167 | 362 | 259 |
| High boilers | [% by wt.] | traces | traces | traces | | | | |
| DMT DMI DMO | [% by wt.] | 0,21 | 0,21 | 0,81 | | 11,93 | 15,00 | 15,00 |
| MMT | [% by wt.] | 0,02 | 0,02 | 0,08 | | | | |
| TPA | [% by wt.] | traces | traces | traces | | | | |
| TAE | [% by wt.] | 0,03 | 0,03 | 0,12 | | 3,18 | 4,00 | 4,00 |
| p-TE | [% by wt.] | 3,67 | 3,67 | 14,22 | traces | 58,56 | 73,60 | 73,60 |
| p-TA | [% by wt.] | 0,21 | 0,21 | 0,81 | | 0,32 | 0,40 | 0,40 |
| BME | [% by wt.] | 2,10 | 2,10 | 8,12 | traces | 6,99 | 7,00 | 7,00 |
| Xylenes | [% by wt.] | 12,35 | 12,35 | 44,34 | 1,25 | 13,72 | | |
| Methyl acetate | [% by wt.] | 0,11 | 0,11 | 0,25 | 0,06 | 0,15 | | |
| Methyl formate | [% by wt.] | 0,05 | 0,05 | 0,08 | 0,04 | 0,02 | | |
| Acetic acid | [% by wt.] | 0,42 | 0,42 | 1,59 | 0,01 | 0,15 | | |
| DME | [% by wt.] | | | | | | | |
| Formic acid | [% by wt.] | 0,21 | 0,21 | 0,78 | 0,01 | 0,09 | | |
| Acetaldehyde | [% by wt.] | 0,05 | 0,05 | 0,06 | 0,04 | traces | | |
| Methanol | [% by wt.] | 0,65 | 0,65 | 2,06 | 0,16 | 0,50 | | |
| Carbon dioxide | [% by wt.] | 1,50 | 1,50 | | 2,02 | | | |
| Oxygen | [% by wt.] | 2,32 | 2,32 | | 3,13 | | | |
| Carbon oxide | [% by wt.] | 0,41 | 0,41 | | 0,55 | | | |
| Nitrogen | [% by wt.] | 68,48 | 68,48 | | 92,27 | | | |
| Water | [% by wt.] | 7,20 | 7,20 | 26,67 | 0,45 | 4,38 | | |
| $NO_x$ as $NO_2$ | [% by wt.] | | | | | | | |

Comment: traces <0,01% by weight
*Reference temperature 0° C.

TABLE 1.2

| Mass stream Medium | Unit | 112 | 114 | 116 | 118 | 120 | 122 | 126 |
|---|---|---|---|---|---|---|---|---|
| Amount | (kg/h) | 76833 | 100 | 76933 | 68132 | 9392 | 9500 | 5000 |
| Pressure | [bar] | 7 | 1,1 | 7 | 7 | 7 | 7 | 7 |
| Temperature | [20 C.] | 46 | 104 | 46,5 | 25 | 26 | 20 | 15 |
| Heat content* | [kW] | 2041 | 6 | 2290 | 1758 | 540 | 205 | 162 |
| High boilers | [% by wt.] | . | | | | | | |
| DMT DMI DMO | [% by wt.] | 0,32 | | 0,32 | 0,32 | | | |
| MMT | [% by wt.] | | | | | | | |
| TPA | [% by wt.] | | | | | | | |
| TAE | [% by wt.] | 0,26 | | 0,26 | 0,26 | | | |
| p-TE | [% by wt.] | 37,83 | | 37,78 | 37,78 | traces | | |
| p-TA | [% by wt.] | 0,01 | | 0,01 | 0,01 | | | |
| BME | [% by wt.] | 57,90 | 98,00 | 57,95 | 57,95 | 0,02 | | |
| Xylenes | [% by wt.] | 0,11 | | 0,11 | 0,11 | traces | | traces |
| Methyl acetate | [% by wt.] | 0,25 | | 0,25 | 0,25 | 0,05 | | |
| Methyl formate | [% by wt.] | 0,07 | | 0,07 | 0,07 | 0,04 | | |
| Acetic acid | [% by wt.] | 0,01 | | 0,01 | 0,01 | traces | 1,55 | 2,22 |
| DME | [% by wt.] | | | | | | | |
| Formic acid | [% by wt.] | 0,08 | | 0,08 | 0,08 | traces | 0,78 | 1,10 |
| Acetaldehyde | [% by wt.] | 0,05 | | 0,05 | 0,05 | 0,05 | | |
| Methanol | [% by wt.] | 0,83 | 2,00 | 0,83 | 0,83 | 0,11 | 0,86 | 0,05 |
| Carbon dioxide | [% by wt.] | | | | | 2,05 | | |
| Oxygen | [% by wt.] | | | | | 3,18 | | |
| Carbon oxide | [% by wt.] | | | | | 0,56 | | |
| Nitrogen | [% by wt.] | | | | | 93,88 | | |
| Water | [% by wt.] | 2,28 | | 2,28 | 2,28 | 0,05 | 96,81 | 96,62 |
| $NO_x$ as $NO_2$ | [% by wt.] | | | | | | | |

Comment: traces <0,01% by weight
*Reference temperature 0° C.

TABLE 1.3

| Mass stream Medium | Unit | 128 | 130 | 150 | 152 | 184 | 228 | 230 |
|---|---|---|---|---|---|---|---|---|
| Amount | (kg/h) | 68240 | 68240 | 83535 | 443 | 9500 | 95150 | 95150 |
| Pressure | [bar] | 7 | 7 | 9 | 1,1 | 1,1 | 7 | 7 |

TABLE 1.3-continued

| Mass stream Medium | Unit | 128 | 130 | 150 | 152 | 184 | 228 | 230 |
|---|---|---|---|---|---|---|---|---|
| Temperature | [20 C.] | 15 | 131 | 115 | 25 | 40 | 123 | 340 |
| Heat content* | [kW] | 497 | 2761 | 2750 | 13 | 440 | 3329 | 9750 |
| High boilers | [% by wt.] | | | | | | | |
| DMT DMI DMO | [% by wt.] | | | | | | | |
| MMT | [% by wt.] | | | | | | | |
| TPA | [% by wt.] | | | | | | | |
| TAE | [% by wt.] | | | | | | | |
| p-TE | [% by wt.] | traces | traces | | | | traces | traces |
| p-TA | [% by wt.] | | | | | | | |
| BME | [% by wt.] | 0,02 | 0,02 | | | | 0,01 | 0,01 |
| Xylenes | [% by wt.] | traces | traces | | | traces | traces | traces |
| Methyl acetate | [% by wt.] | 0,05 | 0,05 | | | | 0,04 | 0,04 |
| Methyl formate | [% by wt.] | 0,03 | 0,03 | | | | 0,03 | 0,03 |
| Acetic acid | [% by wt.] | 0,10 | 0,10 | | | 2,22 | 0,07 | 0,07 |
| DME | [% by wt.] | | | | | | | |
| Formic acid | [% by wt.] | 0,05 | 0,05 | | | 1,10 | 0,03 | 0,03 |
| Acetaldehyde | [% by wt.] | 0,05 | 0,05 | | | | 0,03 | 0,03 |
| Methanol | [% by wt.] | traces | traces | | | 0,05 | traces | traces |
| Carbon dioxide | [% by wt.] | 2,05 | 2,05 | | | | 1,47 | 1,47 |
| Oxygen | [% by wt.] | 3,17 | 3,17 | 23,13 | | | 8,79 | 8,79 |
| Carbon oxide | [% by wt.] | 0,56 | 0,56 | | | | 0,40 | 0,40 |
| Nitrogen | [% by wt.] | 93,73 | 93,73 | 76,57 | | | 88,80 | 88,80 |
| Water | [% by wt.] | 0,17 | 0,17 | 0,30 | 100,00 | 96,62 | 0,32 | 0,32 |
| $NO_x$ as $NO_2$ | [% by wt.] | | | | | | | |

Comment: traces <0,01% by weight
*Reference temperature 0° C.

TABLE 1.4

| Mass stream Medium | Unit | 232 | 234 | 236 | 238 | 240 | 242 |
|---|---|---|---|---|---|---|---|
| Amount | (kg/h) | 97368 | 97368 | 97368 | 97368 | 110888 | 26910 |
| Pressure | [bar] | 7 | 7 | 1,05 | 1,05 | 1,1 | 7 |
| Temperature | [20 C.] | 1000 | 650 | 380 | 165 | 15 | 75 |
| Heat content* | [kW] | 30675 | 19650 | 10978 | 4517 | 787 | 568 |
| High boilers | [% by wt.] | | | | | | |
| DMT DMI DMO | [% by wt.] | | | | | | |
| MMT | [% by wt.] | | | | | | |
| TPA | [% by wt.] | | | | | | |
| TAE | [% by wt.] | | | | | | |
| p-TE | [% by wt.] | | | | | | |
| p-TA | [% by wt.] | | | | | | |
| BME | [% by wt.] | | | | | | |
| Xylenes | [% by wt.] | | | | | | |
| Methyl acetate | [% by wt.] | | | | | | |
| Methyl formate | [% by wt.] | | | | | | |
| Acetic acid | [% by wt.] | | | | | | |
| DME | [% by wt.] | | | | | | |
| Formic acid | [% by wt.] | | | | | | |
| Acetaldehyde | [% by wt.] | | | | | | |
| Methanol | [% by wt.] | | | | | | |
| Carbon dioxide | [% by wt.] | 8,09 | 8,09 | 8;09 | 8,09 | | |
| Oxygen | [% by wt.] | 2,51 | 2,51 | 2,51 | 2,51 | 23,04 | 23,04 |
| Carbon oxide | [% by wt.] | | | | | | |
| Nitrogen | [% by wt.] | 86,77 | 86,77 | 86,77 | 86,77 | 76,27 | 76,56 |
| Water | [% by wt.] | 2,63 | 2,63 | 2,63 | 2,63 | 0,69 | 0,40 |
| $NO_x$ as $NO_2$ | [% by wt.] | traces | traces | traces | traces | | |

Comment: traces <0,01% by weight
*Reference temperature 0° C.

TABLE 2

| Energy-stream | Use | Energy use and distribution [kW] | | | |
|---|---|---|---|---|---|
| | | Steam | Fuel | Electr. energy | Waste heat |
| 200 | Condenser 4 | | | | 7158 |
| 202 | Pump 6 | | | 2 | |
| 204 | Heat exchanger 8 | −103 | | | |
| 206 | Pump 9 | | | 3 | |

TABLE 2-continued

| | | Energy use and distribution [kW] | | | |
|---|---|---|---|---|---|
| Energy-stream | Use | Steam | Fuel | Electr. energy | Waste heat |
| 208 | Pump 10 | | | 1 | |
| 210 | Heat exchanger 11 | | | | 289 |
| 212 | Pump 15 | | | 4 | |
| 214 | Heat exchanger 17 | | | | 278 |
| 221 | Intermediate heat exchanger 27 | | | | 6128 |
| 222 | Heat of combustion for DME | | 4940 | | |
| 224 | Heat of combustion for DMT-residue | | 8150 | | |
| 226 | Heat of combustion for natural gas | | 5720 | | |
| 228 | Heat exchanger 52 | −11025 | | | |
| 230 | Hot gas turbine 54 | | | −8672 | |
| 232 | Air compressor 56 | | | 8672 | |

Reference temperature 0° C.

Abbreviations

DME—Dimethyl ether
DMI—Dimethyl isophthalate
DMO—Dimethyl orthophthalate
DMT—Dimethyl terephthalate
MMT—Monomethyl terephthalate
p-TA—para-Toluic acid
p-TE—Methyl para-toluate (pT ester)
p-X—para-Xylene
TPA—Terephthalic acid
TAE—Terephthalaldehydic acid methyl ester
BME—Methyl benzoate High boilers are organic substances which are not defined and which have boiling points higher than those of the above-mentioned substances.

We claim:

1. A process for the purification of an off gas which originates from oxidation of xylene with air, and is contaminated with aliphatic and/or aromatic substances, said process comprising scrubbing the off gas, and removing the substances to be washed out by absorption in a first absorption stage using an ester or ester mixture originating from a process down-stream from the reaction process, the ester or the ester mixture having a higher boiling point than the substances to be washed out, subjecting the off gas thus purified to a second absorption stage, using an absorption solvent which is an ester or ester mixture having a lower boiling point than the ester or ester mixture of the first absorption stage, and subjecting the off gas thus purified to a third adsorption stage with water.

2. A process according to claim 1, characterized in that the off gas to be purified contains xylene as the substance to be washed out.

3. A process according to claim 1, wherein the ester used in the first adsorption consists of methyl paratoluate (p-TE) or a mixture of p-TE and methyl benzoate (BME).

4. A process according to claim 1, wherein the off gas, after cooling and partial condensation of the organic substances dissolved therein, is purified in the first absorption stage with p-TE or with a p-TE/BME mixture, in a second absorption stage with BME and in a third absorption stage with water.

5. A process according to claim 4, wherein a waste water containing organic waste products is used as the wash water in the final absorption stage.

6. A process according to claim 1, wherein the off gas stream purified by absorption is saturated with a process waste water containing low-boiling organic waste products.

7. A process according to claim 6, wherein the off gas stream is heated by means of waste heat from the oxidation process and saturated with a process waste water containing low-boiling organic waste products.

8. A process according to claim 1 wherein the oxidizable substances present in the off gas after purification by absorption are burned, and the flue gases are used in an expansion turbine for generating energy.

9. A process according to claim 8, wherein oxygen is additionally fed to the off gas prior to combustion, without additional combustible products.

10. A process according to claim 8, wherein the oxidizable substances are burned under a pressure up to 50 bar.

11. A process according to claim 1, wherein the oxidation is conducted under a pressure of 5 to 50 bar.

12. A process according to claim 11, wherein the purification is conducted under a pressure of up to 50 bar.

13. A process according to claim 1, wherein the absorption is preceded by partial condensation, wherein a condensate containing medium and high boiling constituents are removed from the off gas.

14. A process according to claim 1, wherein the ester or ester mixture used in the first absorption stage and the second absorption stage consists essentially of an ester or ester mixture.

15. A process according to claim 1, wherein the ester or ester mixture used in the first absorption stage and the second absorption stage consists of an ester or ester mixture.

* * * * *